Figure 1:
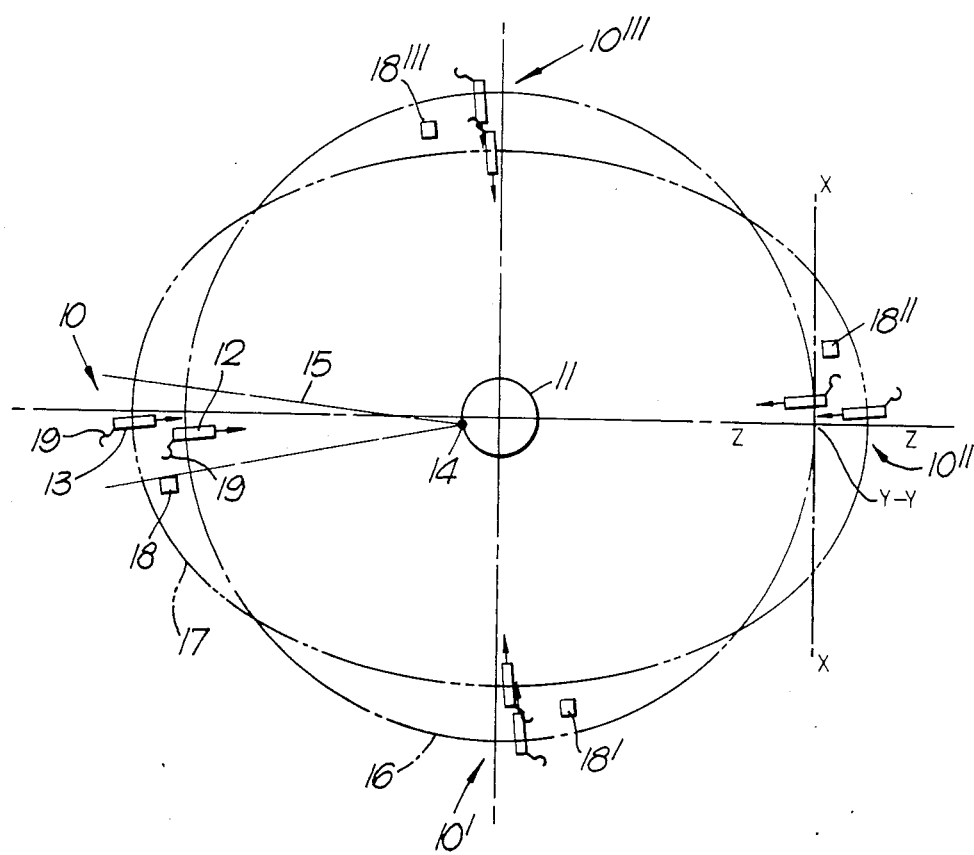

United States Patent [19]

Young

[11] Patent Number: 4,691,882
[45] Date of Patent: Sep. 8, 1987

[54] CO-OPERATIVE SATELLITES

[75] Inventor: Ronald W. Young, Stevenage, England

[73] Assignee: British Aerospace PLC, London, England

[21] Appl. No.: 843,846

[22] Filed: Mar. 27, 1986

Related U.S. Application Data

[63] Continuation of Ser. No. 570,281, Jan. 12, 1984, abandoned.

[30] Foreign Application Priority Data

Jan. 12, 1983 [GB] United Kingdom ................ 8300747

[51] Int. Cl.$^4$ ................................................ B64G 1/10
[52] U.S. Cl. ................................. 244/158 R; 455/13
[58] Field of Search .................... 244/158 R; 343/355, 343/356, DIG. 2; 455/13

[56] References Cited

U.S. PATENT DOCUMENTS

| 3,243,706 | 3/1966 | Grisham | 244/158 |
|---|---|---|---|
| 3,497,807 | 2/1970 | Newton | 455/13 |
| 4,004,098 | 1/1977 | Shimasaki | 455/13 |
| 4,375,697 | 3/1983 | Visher | 455/13 |
| 4,445,118 | 4/1984 | Taybr et al. | 343/356 |

Primary Examiner—Sherman D. Basinger
Assistant Examiner—Rodney Corl
Attorney, Agent, or Firm—Cushman, Darby & Cushman

[57] ABSTRACT

A satellite orbiting arrangement including an orbiting cluster of co-operative satellites in which inter-satellite communication is to be maintained substantially constantly, the arrangement further including an inter-satellite communication satellite positioned remotely from the cluster in an orbit selected to maintain at least approximate station with the cluster and to enable communication with each satellite of the cluster to be maintained substantially constantly.

2 Claims, 7 Drawing Figures

VIEW FROM -Y.

VIEW FROM +X.

VIEW FROM −Y.

VIEW FROM +X.

CO-OPERATIVE SATELLITES

This is a continuation of application Ser. No. 570,281 filed Jan. 12, 1984 which was abandoned upon the filing hereof.

This invention relates to co-operative satellites. Co-operative satellites are an alternative to very large satellites which require very large launch vehicles not presently available at least commercially, and to very large satellite structures (sometimes known as space stations), which can be assembled in space from small, more easily launched components.

Such co-operative satellites are arranged, when in use to orbit, as a cluster of individual satellites located in such proximity that in general they cannot be individually resolved by a communications ground station. In order that the individual satellites remain co-located certain criteria must be met, bearing in mind that each satellite in the cluster circles the Earth on its own individual orbit as if the other cluster satellites were absent. The criteria are (a) the semi-major axes of each individual orbit must be equal, and,
(b) the mean longitudes of each satellite must be approximately equal.

Thus, the individual satellites are co-located and the orbit periods of each are equal so that the cluster does not disperse with time.

Since the individual satellites in effect replace a single unit (i.e. a large satellite or space station), the otherwise single payload will be distributed amongst them. This necessitates an inter-satellite communications network between the members of the cluster; this is conveniently achieved by designating one satellite of the cluster as an inter-satellite communications exchange or network hub through which the inter-satellite communications can be routed. Naturally, one criteria is that the inter-satellite communication satellite shall be always in clear line of sight with each of the individual satellites of the cluster so that inter-satellite communications are maintained without interruption.

The individual satellites of a cluster follow their individual orbits, which although similar, are not identical and, furthermore, because each satellite is directed towards the earth-based communications station at all times, it is found that the line of sight between any two cluster members rotates through a total of 360° during an orbit period. This is for satellites having the same mean longitude. This, in turn, requires that in order to maintain continuous communication between the individual satellites and the inter-satellite communication satellite, each satellite of the cluster must carry a receptor (e.g. an antenna) capable of 360° scanning movement. This requirement is most disadvantageous from the engineering aspect in a satellite which has tightly packed equipment internally and many essential protrusions externally.

According to one aspect of the present invention, a satellite orbiting arrangement includes an orbiting cluster of co-operative satellites in which inter-satellite communication is to be maintained substantially constantly, the arrangement further including an inter-satellite communication satellite positioned remotely from the cluster in an orbit selected to maintain at least approximate station with the cluster and to enable communication with each satellite of the cluster to be maintained substantially constantly.

According to a further aspect of the invention, satellite apparatus for placing in orbit includes a plurality of co-operative satellites which, when in use, orbit as a cluster and require to have inter-satellite communication maintained substantially constantly, and further including an inter-satellite communication satellite which, when in use, is positioned remotely from the cluster in an orbit selected to maintain at least approximate station with the cluster and to enable communication with each satellite of the cluster to be maintained substantially constantly.

Figure 2A:
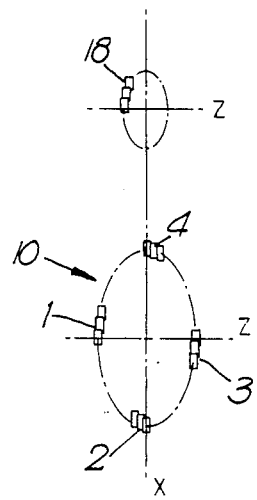
Figure 2B:
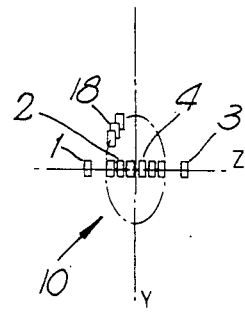
Figure 2C:
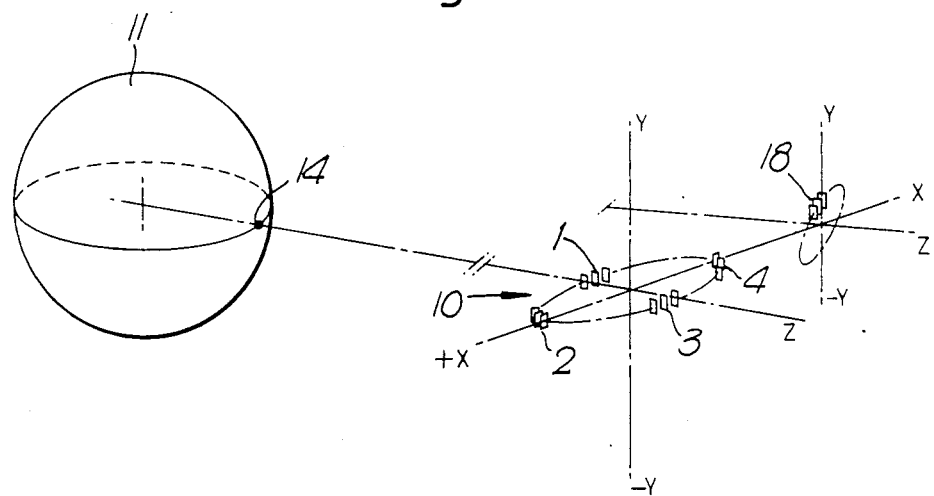

Some embodiments of the invention are now described by way of example with reference to the accompanying drawings in which:

FIG. 1 illustrates, diagrammatically and not to scale, a view on the North Pole of the Earth looking towards the South Pole with a cluster of individual satellites in orbit within an equatorial plane; the cluster is shown four times in varying positions, FIGS. 2A, 2B and 2C are different views of satellite movement in an earth-fixed frame when the satellites are in a cluster of equatorial ellipse geometry, that is to say they lie always in an equatorial plane and follow one another around a planar elliptical path in the earth-fixed frame.

Figure 3A:
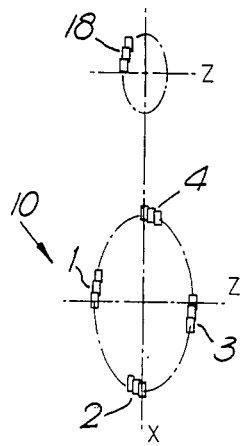
Figure 3B:
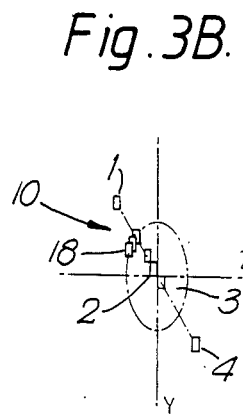
Figure 3C:
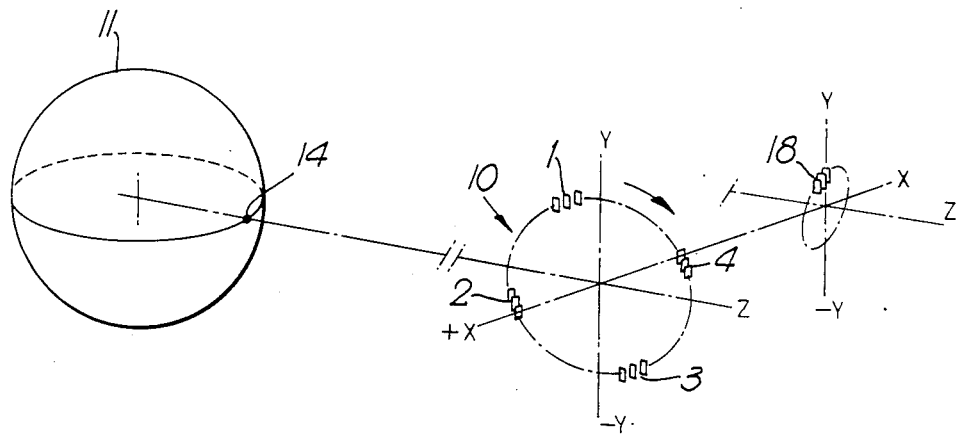

FIGS. 3A, 3B and 3C are similar views to those of FIGS. 2A, 2B and 2C but showing the satellites in a cluster of tilted circle geometry, that is to say they deviate from the equatorial plane and follow one another around a planar circular path in the earth-fixed frame.

Referring initially to FIG. 1, a cluster 10 of satellites are shown in nominal geostationary orbit around the earth 11. For this, the radius of orbit of the cluster is set at approximately 42,000 kilometres in an equatorial plane so that the cluster thus has a period of 24 hours, the same as that of the Earth; the cluster thus appears to be substantially stationary above one spot on the Earth's equator within sight of which a communication station 14 is sited. The cone 15 of "illumination" of the communication station includes all the satellites of the cluster.

For simplicity, this Figure shows only two satellites 12, 13 in the cluster. That referenced 12 is shown by way of example in a perfect circular orbit 16 whilst that referenced 13 is shown slightly displaced from that perfect orbit as would be necessary in any cluster geometry; it therefore follows an elliptical orbit 17. It will be recalled that in a cluster each satellite follows its own orbit, that precise orbit being dependent upon the actual position of the satellite with respect to the truly geostationary orbit.

The cluster is shown in four different positions 10, 10', 10" and 10'''; from these it can be seen that if the satellites are directed always at the earth station 14, as is necessary for them to provide their international communications function, any inter-satellite communication network will require antenna dishes 19 which move angularly through a total of 360° with respect to the satellite body on which it is mounted during each orbital period to give a clear line of sight at all times. As before discussed, this 360° scan is disadvantageous from the engineering aspect; it is difficult to provide.

This relative movement with respect to one another is further illustrated in FIGS. 2 and 3.

In these Figures, $+Z$ points towards the Earth's centre, $+Y$ points South normal to the Earth's equatorial plane, and $+X$ points East along the geostationary orbit (i.e. tangential thereto). In all cases, the frame of reference is earth-fixed. The XYZ co-ordinates are also marked on FIG. 1 for ease of reference.

In these Figures, four satellites 1, 2, 3 and 4 are shown in the cluster. They are similar to those referenced 12 and 13. Each satellite 1, 2, 3, 4 is illustrated three times at 0, 0.02 and 0.04P where P is the orbital period of 24 hours.

The FIGS. 2 show an equatorial ellipse geometry in which the relative movement of members of the cluster in the earth-fixed frame is elliptical, the plane of the ellipse lying in the earth's equatorial plane as is particularly shown in FIG. 2B. These FIGS. 2 show the relative movements of satellites in the orbits similar to those of FIG. 1.

The FIGS. 3 show a tilted circle geometry (an alternative could be a tilted ellipse, for example), in which the satellites are not only displaced in the equatorial plane, but in inclination as well, the plane of the circle (or ellipse) thus lies tilted to the equatorial plane as is particularly shown in FIG. 3B.

Irrespective of the geometry of the cluster it is convenient to designate one satellite being part of or in station with the cluster for inter-satellite communications network purposes. This will be an exchange or network hub satellite having a switching and relay function, so that the individual satellites of a cluster can route their inter-satellite communications through it. This arrangement still requires inconveniently large scanning movements of receptors/antennas. To reduce this movement, the inter-satellite communication satellite is positioned remotely from the cluster.

This is illustrated in FIG. 1, where such a satellite is diagrammatically shown in four positions 18, 18', 18'', and 18'''. Even though its orbit is not identical with all (or necessarily any) members of the cluster, it is evident that the scanning angles of the inter-satellite communication antennas 19 are reduced to angles much more conducive to an engineering solution.

The satellite 18 may or may not be within the ground station cone of "illumination" 15.

The satellite 18 may be positioned in a geostationary orbit similar to that shown for satellite 12, depending upon the orbits chosen for other members of the cluster and bearing in mind the requirement for a clear sight line at all times. It may, alternatively, be placed in such an orbit that it follows an equatorial circular or elliptical geometry as evidenced by those satellites 1, 2, 3 and 4 of FIGS. 2 or a tilted circular or elliptical geometry as evidenced by those satellites 1, 2, 3 and 4 of FIGS. 3. Any of these options are selectable to provide a clear sight line between the satellite 18 and the members of the cluster 10, whilst maintaining a relatively small scan angle for the antennas 19.

In this respect, it may be advantageous if the plane of the ellipse or circule of the relative motion of the satellite 18 is inclined to that of the cluster 10. An example of such an arrangement is shown superimposed on FIGS. 2B and 3B, as satellite 18 with an elliptical relative path when viewed along axis X and to the right of FIGS. 2C and 3C.

It is possible to include a spare inter-satellite communication satellite 18 in close promitity orbit to original satellite 18. Moreover, the satellite 18 could well provide inter-satellite communications for a further cluster (not shown) additional to that referenced 10, or for providing communications to other clusters, satellites or space stations.

I claim:

1. Satellite apparatus in orbit including a plurality of co-operative satellites which orbit as a generally geostationary cluster of co-operative satellites in which inter-satellite communication is to be maintained substantially constantly, and an inter-satellite communication satellite arranged to effect such constant communication, each satellite of the cluster being oriented so that a given region is always earth directed and being placed in its own orbit such that the satellites of the cluster follow each other around a path centered substantially at a given longitude with reference to an earth fixed frame, each satellite of the cluster having its own receptor means directed at all times toward the inter-satellite communication satellite, the inter-satellite communication satellite being placed in an orbit so selected that it follows a path centered substantially at a further longitude spaced from said given longitude to maintain approximate station with the cluster but positioned remotely therefrom whereby the receptor of each satellite of the cluster is directed toward the inter-satellite communication satellite at all times without the receptor rotating through more than one half of one revolution with reference to its satellite.

2. A satellite orbiting arrangement including a generally geostationary orbiting cluster of co-operative satellites in which inter-satellite communication is to be maintained substantially constantly, and an inter-satellite communication satellite arranged to effect such constant communication, each satellite of the cluster being orientated so that a given region is always earth directed and having its own orbit such that the satellites of the cluster follow each other around a path of centered substantially at a given longitude with reference to an earth fixed frame, each satellite of the cluster having its own receptor means directable at all times toward the inter-satellite communication satellite, the inter-satellite communication satellite being placed in an orbit so selected that it follows a path centered substantially at a further longitude spaced from said given longitude to maintain approximate station with the cluster but positioned remotely therefrom whereby the receptor of each satellite of the cluster can be directed toward the inter-satellite communication satellite at all times without the receptor rotating through more than one half of one revolution with reference to its satellite.

* * * * *